United States Patent [19]

Blakeman et al.

[11] Patent Number: 5,747,579
[45] Date of Patent: May 5, 1998

[54] CONTAINER SEALING COMPOSITIONS USING LATENT CROSS-LINKING AGENT

[75] Inventors: Peter John Blakeman, Bedford; Terence Richard Johnson, Cambs, both of England

[73] Assignee: W.R. Grace & Co.-Conn., New York, N.Y.

[21] Appl. No.: 790,181

[22] Filed: Jan. 29, 1997

Related U.S. Application Data

[63] Continuation of Ser. No. 672,685, Jun. 28, 1996, abandoned, which is a continuation of Ser. No. 414,396, Mar. 31, 1995, abandoned, which is a continuation of Ser. No. 127,289, Sep. 27, 1993, abandoned, which is a continuation of Ser. No. 945,574, Sep. 16, 1992, abandoned, which is a continuation of Ser. No. 713,627, Jun. 10, 1991, abandoned, which is a continuation of Ser. No. 465,106, filed as PCT/GB89/00724 Jun. 29, 1989, abandoned.

[30] Foreign Application Priority Data

Jun. 29, 1988 [GB] United Kingdom ............. 8815489

[51] Int. Cl.$^6$ ........................................ C08J 31/00
[52] U.S. Cl. ............... 524/562; 525/329.6; 525/329.9; 525/370
[58] Field of Search ............. 524/562; 525/329.6, 525/329.9, 370

[56] References Cited

U.S. PATENT DOCUMENTS

| | | | |
|---|---|---|---|
| 4,423,182 | 12/1983 | Bartman | 524/367 |
| 4,503,184 | 3/1985 | Marongiu | 524/519 |
| 4,544,690 | 10/1985 | Ladish | 524/60 |
| 4,699,810 | 10/1987 | Blakeman et al. | 427/244 |

FOREIGN PATENT DOCUMENTS

| | | |
|---|---|---|
| 0 099 792 | 6/1983 | European Pat. Off. . |
| 182674 | 5/1986 | European Pat. Off. . |
| 61-145273 | 2/1986 | Japan . |
| 2084600 | 9/1984 | United Kingdom . |

OTHER PUBLICATIONS

Patent abstracts of Japan, vol. 12, No. 496, dated Dec. 23, 1988, citing JP 632-07816.

Patent abstracts of Japan, vol. 12, No. 139, dated Apr. 27, 1988, citing JP62256885 has been cited in the international search report.

*Primary Examiner*—Christopher D. Rodee
*Assistant Examiner*—Cheryl Juska
*Attorney, Agent, or Firm*—Craig K. Leon; William L. Baker

[57] ABSTRACT

A container sealing latex composition is formed from a carboxylated styrene butadiene elastomer wherein the carboxyl groups are preferably provided by methacrylic acid, and the composition is substantially free of active crosslinking agent and preferably includes latent crosslinking agent and stabilise such as casein, rosin acid, styrene maleic anhydride copolymer or fatty acid.

8 Claims, No Drawings

CONTAINER SEALING COMPOSITIONS USING LATENT CROSS-LINKING AGENT

This is a continuation of application Ser. No. 08/672,685, filed on Jun. 28, 1996, (abandoned) which is a continuation of U.S. Ser. No. 08/414,396, filed on Mar. 31, 1995, (abandoned) which is a continuation of U.S. Ser. No. 08/127,289 filed on Sep. 27, 1993 (abandoned), which is a continuation of U.S. Ser. No. 07/945,574 fled on Sep. 16, 1992, (abandoned) which is a continuation of U.S. Ser. No. 07/713,627 filed on June 10, 1991, (abandoned) which is a continuation of U.S. Ser No. 07/465,106, filed as PCT/GB89/00724 Jun. 29, 1989 (abandoned).

It is well known to form can sealing latex compositions by blending one or more latices of elastomeric material with additives such as tackifier resin, stabiliser and filler. In use, the liquid latex is lined on to, for instance, a can end and dried to form a gasket or other dried deposit.

Numerous synthetic elastomer latices have been proposed. Styrene butadiene rubbers have been widely mentioned and used. Often such rubbers (SBR) have been described as carboxylated. Typical disclosures of latex compositions are in GB 2,084,600 and EP 182674.

It is known that these carboxylated styrene butadiene rubbers have always been copolymers of styrene with butadiene and fumaric acid as the ethylenically unsaturated acid that provides the carboxylic groups. This is known from, for instance, the submissions that have had to be made by the manufacturers to various governmental agencies for permission to use the latices in connection with food packaging. It appears that no other carboxylic acids have ever been used for carboxylation of the SBR latices used in container sealing compositions.

The use of fumaric-carboxylated latices does, as would be expected, give improvements (relative to the corresponding uncarboxylated latex) in for instance mechanical stability and adhesion. It is of particular importance that the container sealing composition gives good sealing performance in practical use. Tests for this are the biological seal test and the extrusion test, as described in GB 2084600. We have found that the carboxylated latex does not generally give an improvement in these tests and indeed can result in inferior extrusion test results.

When the latex is carboxylated, there is the possibility of the elastomer being cross linked by ionic cross linking agents, and this will result in a change of properties. The cross linking can, depending upon conditions, occur either in the liquid latex composition or during or after the drying of the lined gasket or other deposit. If conditions are such that cross linking occurs in the latex it could tend to destabilise the latex and thus increase the viscosity, and possibly even cause coagulation, of the composition. This tendency for viscosification or coagulation can be counteracted by using a sufficiently large amount of certain types of stabiliser. The stabilisers that are effective for this purpose are those that are relatively resistant to cross linking, for instance materials such as sodium dodecyl benzene sulphonate or other synthetic surfactants containing sulphonate groups. However the use of such surfactants in the required amounts tends to render the final gasket more hydrophilic, in the sense that it is more receptive to deterioration of its properties in the presence of water. This can be the opposite of the effect that the cross linking is intended to promote.

One such system is described in JP-A-61-145273. This describes a sealing composition based on a carboxylic-modified styrene butadiene rubber together with 5 to 150 parts tackifier and 0.5 to 130 parts zinc oxide (as cross linking agent), the parts being by weight per 100 parts by weight of the rubber (PHR). The description makes it clear that optimum properties are, for the tests described in that application, achieved when the amount of zinc oxide is relatively high, for instance at least 10 parts and often much more. In most of the examples the amount of zinc oxide is 47.5 parts. Although various stabilisers are mentioned in the general description, the one that is used in all the examples is sodium dodecyl benzyl sulphonate. As explained above, this is a material that is inert to the cross linker but which renders the gasket relatively hydrophilic.

The latex that is used in all the examples and that is recommended in JP-A-61-145273 is, as is customary in the art, a latex made using fumaric acid as the ethylenically unsaturated carboxylic acid. However the patent also mentions that the acid could be maleic acid, maleic anhydride, acrylic acid, methacrylic acid, crotonic acid, itaconic acid, itaconic anhydride, aconitic acid or tetrahydrophthalic acid or others. Accordingly this disclosure does not alter the general state of the art, and in particular the use in practice of fumaric acid as the source of the carboxylic groups in the carboxylated styrene butadiene rubber.

It is known to be possible to reduce the hydrophilic properties of gaskets made from a rubber latex by using a stabiliser that becomes cross linked substantially only during or after drying. Thus it is known to use a combination of a stabiliser that contains cross linkable (generally carboxylic) groups and a latent cross linker, i.e., a material that causes cross linking in the dried gasket but not in the liquid latex. This latent cross linker is often termed a "waterproofing agent" as it is present to reduce the hydrophilic properties of the gasket. One such material is zinc ammonium benzoate. The zinc ions are complexed by ammonia so as to be substantially inert in the liquid composition. Upon drying, ammonia is liberated and the zinc becomes available for reaction and cross links the stabiliser. Presumably the liberated zinc will also cross link the carboxylic groups of carboxylated SBR if that is used as part or all of the rubber. The effect is to increase the water resistance of the dried gasket or other deposit.

It should be appreciated that throughout this specification we use the term "cross link" to refer to two or more molecules becoming linked by reaction with a single polyvalent metal ion or other cross linking agent.

If large amounts of zinc oxide or other active cross linker are included in such compositions (as proposed in JP-A-61-145273), the zinc oxide will naturally tend to cross link the carboxylic-containing stabiliser in the liquid composition, and this will tend to result in additional destabilisation of the liquid latex. This in turn necessitates the addition of further stabiliser (preferably a sulphonate surfactant) and this reduces the water resistance of the gasket.

It would be desirable to be able to provide a latex that retains the advantages of the fumaric-carboxylated latices and which can give better overall sealing performance.

A container sealing latex composition according to the invention comprises a latex of carboxylated styrene butadiene elastomer formed by polymerisation with an ethylenically unsaturated acid, and into which has been dispersed additives selected from the group comprising filler, tackifier, stabiliser, active cross linking agent and latent cross linking agent characterised in that the ethylenically unsaturated acid is selected from methacrylic acid, acrylic aced and itaconic acid and the composition is substantially free of active cross linking agent.

Thus in the invention we replace the fumaric acid that has always, so far as we are aware, been used commercially for carboxylation of SBR for container sealing, latex, compositions and we use methacrylic, acrylic or itaconic acid. We have found that (provided the composition is free of active cross linker) this can lead to surprising improvement in sealing performance. Although the use of any of the three acids can give improved biological seal properties (relative to the use of the corresponding uncarboxylated or fumaric-carboxylated latex), the use of methacrylic acid gives the best overall performance and so is strongly preferred for use in the invention. The invention is of particular value when the composition includes a cross linkable stabiliser and a latent cross linker.

The defined acids can be used individually or as mixtures with each other or with another carboxylic acid (generally in a lesser amount), but preferably methacrylic acid is used as part (and most preferably all) the carboxylic acid.

Although the amount of methacrylic or other carboxylic acid can be, for instance, 0.5 to 6% by weight of the elastomer, preferably the amount is 0.5 to 3%, most preferably 0.8 to 2%.

The methacrylic or other acid may be copolymerised into the styrene butadiene rubber by techniques that are conventional for the copolymerization of styrene, butadiene and fumaric acid. Generally it is polymerised in alkali salt form.

The proportions of styrene and butadiene are generally each 30 to 70% (based on 100 parts by weight styrene plus butadiene). Typically the amount of butadiene is 35 to 55% (generally 40 to 49%) and the amount of styrene is 45 to 65% (generally 51 to 60%).

The rubber typically has a Mooney viscosity of 35 to 55 (1+4 at 125° C.) using the standard large rotor.

A blend of elastomer latices may be used in which event the defined carboxylated latex generally provides at least 30%, usually at least 50%, by weight total rubber solids. Other elastomer latices that can be used can be selected from those listed in GB 2,084,600 but would preferably be other styrene butadiene rubbers. These could be carboxylated but are preferably uncarboxylated.

The container sealing composition is provided by dispersing the desired additives into the latex (which can be a mixture of latices, as explained above). The additives can be selected from any of those that are conventional for incorporation in container sealing latex compositions and these include materials such as filler, tackifier, stabiliser, latent cross linking agent, active cross linking agent and other conventional materials.

The composition is preferably substantially free of active cross linking agent. Active cross linking agents are materials that will cause cross linking in the liquid composition of carboxylic groups in the carboxylated SBR and/or in any carboxylated stabiliser that is present, this cross linking then tending to cause instability or other undesirable properties in the latex liquid composition. The active cross linkers are generally ionic materials and are usually polyvalent metal compounds such as zinc oxide or zinc or other metal salts in which the polyvalent metal ion is available in the liquid latex for causing cross linking. Small amounts of active cross linker can be tolerated since they may give no destabilisation of the latex either because they are converted to a latent form by other components of the latex or because the extent of cross linking of the carboxylated SBR and/or carboxylated stabiliser (if present) is sufficiently low that instability and other undesirable properties are not caused. Generally therefore the amount of active cross linker is always well below 5PHR (parts by weight per hundred parts rubber) and usually below 2PHR and most usually below 0.5PHR. If active cross linker is present, its amount is generally in the range 0.1 to 0.4PHR but preferably the amount is zero, i.e., it is totally absent.

The composition preferably contains latent cross linking agent, that is to say cross linking agent that does not react with the carboxylic groups of the carboxylated latex and/or carboxylated stabiliser (if present) sufficient to cause significant cross linking in the liquid composition, but will cause cross linking upon drying of a gasket or other deposit formed from the liquid latex.

The latent cross linking agent typically comprises a polyvalent metal compound wherein the polyvalent metal ions are chelated with a volatile chelating agent. This chelating agent substantially prevents the metal ions being available for cross linking in the liquid latex but upon drying of the deposit the chelating agent volatilises thereby liberating the polyvalent metal ions which thus become available as active cross linking agents. Ammonia is a convenient volatile chelating agent but various other volatile amines and volatile amino compounds may be used. The polyvalent metal compound typically is a salt of the polyvalent metal with a carboxylic acid in the presence of the chelating agent. The carboxylic acid is preferably benzoic or citric acid, but other relatively weak aliphatic or aromatic acids can be used. Preferred materials are zinc ammonium benzoate and zinc ammonium citrate. Typically the materials that are already known as water proofing agents for latices containing carboxylated stabilisers are suitable. The amount of zinc ammonium benzoate or other water proofing agent can be selected to obtain optimum properties in any particular composition, dependent for instance upon the amount and nature of the stabiliser. Generally the amount is in the range 0.2 to 12PHR, often 0.2 to 4PHR (as dry weight of the active cross linker that is formed from the latent cross linker, e.g., the metal carboxylate).

It is possible for the compositions of the invention to include stabilisers that are relatively inert to the latent cross linking agent (during drying). Stabilisers of this type are ethylene oxide ethers and synthetic aromatic sulphonates, for instance sodium dodecyl benzene sulphonate. However it is generally desirable to minimise the amounts of such materials since they increase the water sensitivity of the compositions. If such materials are present, they should always be present in very low quantities, generally well below 3PHR and preferably well below 1PHR, most preferably below 0.5PHR. Preferably such materials are totally absent. It must, however, of course be appreciated that non-carboxylated emulsifiers may have been incorporated during the production of the initial latex of carboxylated SBR as oil-in-water emulsifiers, and the compositions will generally therefore additionally contain the oil-in-water emulsifier that was required for production of the initial latex.

The stabilisers that are added to the composition during the formulation of the latex with the other additives that are necessary to render it into a container sealing composition preferably therefore include, and most usually consist of, stabilisers that can be cross linked during drying, as a result of the inclusion of latent cross linking agent in the liquid latex. Such stabilisers have free carboxylic groups.

One preferred stabiliser of this type is casein. Typically this is present in amounts of 10 to 20PHR, in which event the amount of latent cross linker may be up to 12PHR, typically 6 to 12PHR.

Another stabiliser is styrene maleic anhydride copolymer (which may be partially esterified). Typically this is present in amounts of 3 to 10PHR in which event the amount of latent cross linking agent typically is up to 9PHR, preferably 1 to 9PHR.

Another stabliser is a resin acid such as rosin acid, and such materials are typically present in amounts of 1 to 6PHR in which event the amount of latent cross Linking agent is usually up to 2PHR, preferably 0.2 to 2PHR.

Another stabiliser is a fatty acid or a water soluble salt thereof, for instance sodium or ammonium salt, typical acids being oleic acid, stearic acid, palmitic acid, lauric acid or myristic acid. The amount of fatty acid is typically 1 to 8PHR in which event the amount of latent cross linking agent is typically up to 3PHR, preferably 0.2 to 3PHR. All these amounts are calculated on the dry weight of the final cross linker compound, e.g. zinc benzoate.

The optimum amount of stabiliser in any particular instance depends also on the amount of filler, with higher amounts of filler tending to require the use of higher amounts of stabiliser. The amount must therefore be selected to impart the desired storage stability and lining characteristics to the liquid latex and, in particular, to ensure that the liquid latex does not coagulate or thicken undesirably upon storage.

The preferred fillers are kaolin or china clay but others that can be used include colloidal silica and other silicic fillers, synthetic silicates, calcium carbonate, talc or dolomite. Glass beads can be used. The filler typically has a particle size up to 50 microns but some or all of the filler can be of pigmentary grade, having a particle size below 5 microns. For instance carbon black may be incorporated.

The compositions may include tackifier resins and/or other conventional additives. Suitable materials, and suitable amounts of all the components, are described in GB 2,084,600.

The latex compositions of the invention can be formulated and then used as can or other container sealing compositions in known manner, for instance as descibed in GB 2,084,600.

The invention includes can or other container ends that are lined with the dried composition, sealed containers in which the dried composition serves as a gasket, methods of making the container ends by lining them with the composition and then drying it, and methods of sealing the containers using an end carrying a gasket of the dried composition.

As explained, the invention requires the use of the specified acid, rather than fumaric acid, as the unsaturated acid that is used in the manufacture of the carboxylated SBR. The use of the resultant latex in container sealing compositions containing conventional additives but which are free or substantially free of active cross linking agent gives performance benefits, including water resistance, that are not obtainable when using fumaric acid as the acid in all such compositions and that are not obtainable when using the specified acid in compositions containing large amounts of active cross linking agent. The invention is of particular value when, as is preferred, the composition includes stabilisers that can be cross linked by latent cross linking agent, which is also present in the composition. The performance benefits that are obtained include improved water resistance and include sealing performance both when exposed to wholly aqueous compositions and when exposed to oil or fat-containing compositions.

The following are examples of the invention.

EXAMPLE 1

Three latex compositions were formed by blending 100 parts by weight of a latex of styrene butadiene rubber, based on the dry rubber content of the latex, 85pbw filler, 17.5pbw aqueous thickeners, 25pbw tackifier resin, 1pbw rosin acid as hydrophilic stabiliser, 2pbw of a 19% aqueous solution of zinc ammonium benzoate (providing about 0.4pbw dry weight zinc benzoate) waterproofing agent, pH adjuster to pH10 and minor amounts of conventional additives.

Can ends were lined with the compositions in conventional manner. They were subjected to compound extrusion and biological seal tests, both with and without fat, to determine their effectiveness as gaskets.

In composition A the rubber was conventional, non-carboxylated butadiene styrene rubber of about 52% styrene and 48% butadiene. In composition B, the rubber was a conventional copolymer with fumaric acid of about 58% styrene, 39% butadiene and 3% fumaric acid.

In composition C, the rubber was about 52.5% styrene, 46% butadiene and 1.5% methacrylic acid.

In composition D, the rubber was the same as in C except that itaconic acid was used instead of methacrylic acid. In composition E, the carboxylated latex is believed to have been formed using 3% acrylic acid as the carboxylic acid.

The results are given in the table I. The tests are described in GB 2,084,600. CF stands for chicken fat and SF stands for steam flow.

TABLE 1

| Latex | Sealing Performance | | | Compound Extrusion |
|---|---|---|---|---|
| | Bio | Bio + CF | Bio + SF | |
| A | 125 | 150 | 420 | 0.0 |
| B | 150 | 160 | 405 | 2.4 |
| C | 10 | 60 | 150 | 0.8 |
| D | 10 | 35 | 170 | 2.3 |
| E | 30 | 30 | 150 | 3.0 |

This clearly demonstrates the greatly improved overall sealing performance obtained using composition C, in which the unsaturated acid is methacrylic acid, compared to composition A (uncarboxylated) and composition B, in which the acid is fumaric acid. It also shows that compositions D and E give improved biological seal performance compared to A and B, but that the extrusion performance of D and E is less satisfactory than C and A.

EXAMPLE 2

Compositions as described in Example 1C were formulated with amounts of 19% aqueous zinc ammonium benzoate solution ranging from zero to 10 PHR (0 to 2PRR dry weight). The degree of swelling of the resultant dried gasket after exposure to toluene under standard conditions was recorded. The same test was also applied to a composition in which zinc benzoate was omitted and 5PHR zinc oxide was included. The results are as follows.

TABLE 2

| Zinc Ammonium Benzoate | Viscosity after 8 days | Swelling |
|---|---|---|
| 0 | low | 69% |
| 2 | low | 70% |
| 4 | low | 72% |
| 6 | low | 69% |
| 10 | low | 58% |
| 5 ZnO | high | 58% |

It is apparent from this table that significant instability is created when the amount of zinc oxide is 5PHR whereas the liquid composition is stable at 10PHR aqueous latent cross linking agent (2PHR dry weight). What is particularly interesting is that the swelling performance in oil is substantially the same using the 10PHR aqueous latent cross linking agent (that gives a stable liquid composition) and the 5PHR zinc oxide (that gives an unstable composition).

EXAMPLE 3

In order to demonstrate the effect of various polyvalent metal compounds on the carboxylated SBR latex alone (in the absence of added stabiliser), the latex used in Example 1C was formulated with amounts of zinc oxide ranging from 1 to 50PHR, or with amounts of barium sulphate ranging from 1 to 35PHR or with various amounts of zinc ammonium benzoate. There is no sign of latex instability when using barium sulphate. When using higher amounts of zinc benzoate viscosity increase tended to occur upon storage. In those tests using zinc oxide alone, slight coagulation occurred substantially immediately when using 1PHR zinc oxide and the extent of coagulation increased as the amount of zinc oxide increased.

This is further confirmation that although trivially low amounts of zinc oxide may not cause significant cross linking and destabilisation (and minor amounts of destabilisation can be compensated for by minor additions of surfactant) larger amounts of zinc oxide are highly detrimental to stability and could only be compensated for by increasing the amount of surfactant, with the consequential disadvantages of this.

EXAMPLE 4

In order to observe the water resistance of compositions made using a latent cross linker and a cross linkable or non cross linkable stabiliser, compositions were prepared using a carboxylated SBR latex made using methacrylic acid. Films were cast from the compositions and dried at 105° C. for 45 minutes, stored over phosphorus pentoxide for 24 hours, and then exposed to 100% relative himidity for 3 hours. The % increase in weight at different times during the exposure was recorded.

The compositions (expressed in PHR) and the % weight increase are shown in Table 3.

TABLE 3

| Composition | | |
|---|---|---|
| latex | 100 | 100 |
| China clay | 85 | 85 |
| 19% aq. Zinc. amm. benzoate | 2 | 2 |
| Rosin acid | 1 | 0 |
| Dodecyl benzene sulphonate | 0 | 1 |

TABLE 3-continued

| % weight increase | | |
|---|---|---|
| 1 hour | 0.85 | 1.66 |
| 2 hours | 1.03 | 1.72 |
| 3 hours | 1.11 | 1.50 |

This clearly demonstrates the reduced water absorption in the presence of a cross linkable stabiliser rather than a sulphonate surfactant.

We claim:

1. A container sealing latex composition consisting essentially of a latex of a rubbery polymer that is a carboxylated styrene butadiene elastomer formed by copolymerization with an ethylenically unsaturated acid selected from the group consisting of methacrylic acid, acrylic acid and itaconic acid;

a carboxylated stabilizer selected from the group consisting of a styrene maleic anhydride copolymer, resin acids, casein, and fatty acids or salts thereof, said carboxylated stabilizer being cross linked substantially only during or after drying of the latex container sealing composition; and a latent cross-linking agent selected from the group consisting of zinc ammonium benzoate and zinc ammonium citrate, and said agent being operative to cause substantial cross linking in the latex container sealing composition when dried as a gasket but not when the latex is in liquid form.

2. A composition according to claim 1 in which the ethylenically unsaturated acid is methacrylic acid.

3. A composition according to claim 1 in which active cross linking agent is not present.

4. A composition according to claim 1 wherein the stabilizer can be cross linked by a polyvalent metal compound.

5. A composition according to claim 1 in which the amount of the ethylenically unsaturated acid is 0.5 to 3% by weight of the elastomer.

6. A composition according to claim 1 which the amount of the ethylenically unsaturated acid is 0.8 to 2% by weight of the elastomer.

7. A composition according to claim 1 in which the amount of butadiene in the elastomer is 35 to 55% and the amount of styrene is 45 to 65% and the rubber has a Mooney viscosity of 35 to 55.

8. The composition of claim 1 wherein the amount of the ethylenically unsaturated acid of 0.5 to 3% by weight of the elastomer and the amount of butadiene in the rubbery polymer is 35 to 55% and the amount of styrene is 45 to 65% and the rubbery polymer has a Mooney viscosity of 35 to 55.

* * * * *